United States Patent
Freyman

(10) Patent No.: US 6,934,138 B2
(45) Date of Patent: Aug. 23, 2005

(54) METHOD AND DEVICE FOR BONDING AC UTILITIES AND HFC ACCESS NETWORKS FOR SURGE MITIGATION

(75) Inventor: Phillip Kent Freyman, Elgin, IL (US)

(73) Assignee: General Instrument Corporation, Horsham, PA (US)

(*) Notice: Subject to any disclaimer, the term of this patent is extended or adjusted under 35 U.S.C. 154(b) by 197 days.

(21) Appl. No.: 10/214,838

(22) Filed: Aug. 8, 2002

(65) Prior Publication Data

US 2004/0027754 A1 Feb. 12, 2004

(51) Int. Cl.[7] .............................................. H01C 7/12
(52) U.S. Cl. ..................................... 361/91.1; 361/119
(58) Field of Search ....................... 361/91.1, 111–120, 361/123–127

(56) References Cited

U.S. PATENT DOCUMENTS

| | | | | |
|---|---|---|---|---|
| 4,807,083 A | * | 2/1989 | Austin ........................ | 361/111 |
| 4,876,713 A | * | 10/1989 | Crosby et al. .............. | 379/412 |
| 4,903,161 A | * | 2/1990 | Huber et al. ................. | 361/56 |
| 5,675,468 A | * | 10/1997 | Chang ......................... | 361/119 |
| 5,835,326 A | * | 11/1998 | Callaway ..................... | 361/111 |
| 6,249,415 B1 | * | 6/2001 | Daoud et al. ............... | 361/117 |
| 6,252,754 B1 | * | 6/2001 | Chaudhry .................... | 361/111 |
| 6,282,075 B1 | * | 8/2001 | Chaudhry .................... | 361/111 |

* cited by examiner

*Primary Examiner*—Brian Sircus
*Assistant Examiner*—Danny Nguen
(74) *Attorney, Agent, or Firm*—Lawrence T. Cullen

(57) ABSTRACT

A method and/or device that may be used in locations where equipotential bonding is not practiced can be installed on a customer premises equipment device basis that provides over-voltage protection between the AC main and HFC ground planes. According to one aspect of the present invention, a bonding link is established between the AC main and the HFC coaxial braid that allows energy surges to bypass the CPE equipment and to be passed on to the AC mains, which are traditionally more equipped to deal with these large energy surges. According to another aspect of the present invention, an apparatus is disclosed that may be incorporated into any premises powered HFC CPE device for protection. The apparatus provides a surge energy bypass path around the CPE device being protected and allow voltage differentials to be normalized between systems.

7 Claims, 5 Drawing Sheets

US 6,934,138 B2

METHOD AND DEVICE FOR BONDING AC UTILITIES AND HFC ACCESS NETWORKS FOR SURGE MITIGATION

FIELD OF THE INVENTION

The present invention relates generally to methods and apparatuses for suppressing power surges, and more particularly to a method and apparatus for suppressing power surges in communications networks, such as hybrid-fiber coaxial cable networks.

BACKGROUND

Premises powered HFC Customer Premises Equipment (CPE) bridges across the AC power utility and CATV HFC ground planes. During surge events (Lightning) voltage differentials across these ground planes can be generated and can assert significant electrical stress across the CPE device leading to device damage.

Safety and reliability groups recognize the effectiveness of establishing an equipotential bond between the AC utility service and telecommunications lines at the premises entry point. The implementation of these system wide practices varies due to local practices or physical limitations. The failure to establish the equipotential bond between the AC utilities and the telecommunications lines (e.g., HFC coaxial cables) allows induced surges to create significant voltage differentials between systems and across CPE devices.

The present invention is therefore directed to the problem of developing a method and apparatus for preventing energy surge events from damaging CPE equipment in a cable access unit installation.

SUMMARY OF THE INVENTION

The present invention solves these and other problems by inter alia providing a method and/or device that may be used in locations where equipotential bonding is not practiced that can be installed on a CPE device basis that provides over-voltage protection between the AC main and HFC ground planes. According to one aspect of the present invention, a bonding link is established between the AC main and the HFC coaxial braid that allows energy surges to bypass the CPE equipment and to be passed on to the AC mains, which are traditionally more equipped to deal with these large energy surges.

According to another aspect of the present invention, an apparatus is disclosed that may be incorporated into any premises powered HFC CPE device for protection. The apparatus provides a surge energy bypass path around the CPE device being protected and allow voltage differentials to be normalized between systems.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention enables an improvement in system resistibility to transients, which is key to achieving highly available systems and minimizing service costs. By providing a bypass route around customer premises equipment that is coupled to a communications cable, the embodiments of the present invention prevent damage to customer premises equipment while sending a surge transient to facilities more properly equipped to deal with such surge transients.

There are a number of variations in AC utilities in the international market place. In many locations, the AC line cord is a two-wire hot and neutral connection that does not provide a third wire earthing point. In some cases, the line cord is not polarized allowing the exchange of the "hot" and "neutral" leads resulting in a further reduction of any common reference (neutral to earth). This type of interface is the worst-case situation for surge damage because there is no access to a safety earthing point.

Figure 6:
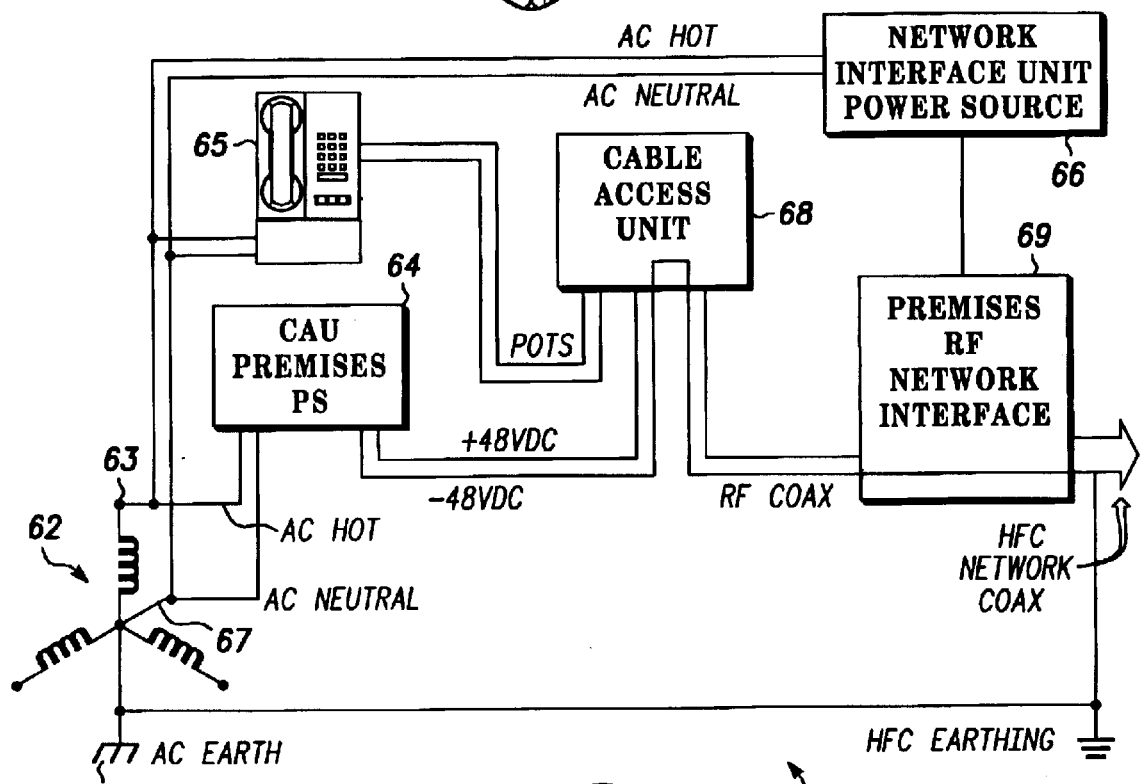
FIG. 6 depicts a typical customer premises powered cable access unit installation.

Turning to FIG. 6, shown therein is a typical customer premises powered cable access unit installation 60. Starting at the lower left portion of the drawing, AC earth 61 is coupled to the AC Mains three Phase Step-down Transformer 62. The AC "hot" phase 63 is coupled to the Cable Access Unit Premises Power Source (PS) 64. The AC "hot" phase 63 is also coupled to the CPE telephone equipment 65 and the Network Interface Unit Power Source 66. The AC neutral phase 67 is similarly coupled to the Cable Access Unit Premises Power Source 64, the CPE telephone equipment 65 and the Network Interface Unit Power Source 66. In turn, the CPE telephone equipment 65 is coupled to the Cable Access Unit 68 via two plain old telephone system (POTS) lines. The Cable Access Unit 68 provides K.21 secondary isolation and protection on the POTS lines. Two power lines (+48V DC, −48V DC) provide power to the Cable Access Unit 68 from the Cable Access Unit Power Source 64, which provides only isolation between the AC mains and the 48 Volt secondary (HFC braid). The Cable Access Unit 68 makes the HFC coax braid common to the −48 Volt DC line. The Network Interface Unit Power Source 66 provides power directly to the Premises RF Network Interface Unit 69. An RF Coaxial cable couples the Cable Access Unit to the Premises RF Network Interface Unit 69, which in turn is coupled to the HFC Network coaxial cable(s). The Network Interface Unit 69 metal cast body makes "F" connector braids common, passing surges around the Network Interface Unit 69.

Earth resistance allows potential differences to develop between "earths." These potential differences then translate to voltage differences across the premises devices. Depending on the magnitude of the surge, eventually some device will breakdown and fail. The surge may occur on the AC mains or on the HFC Network, the only difference being the direction of the flow.

Figure 7:
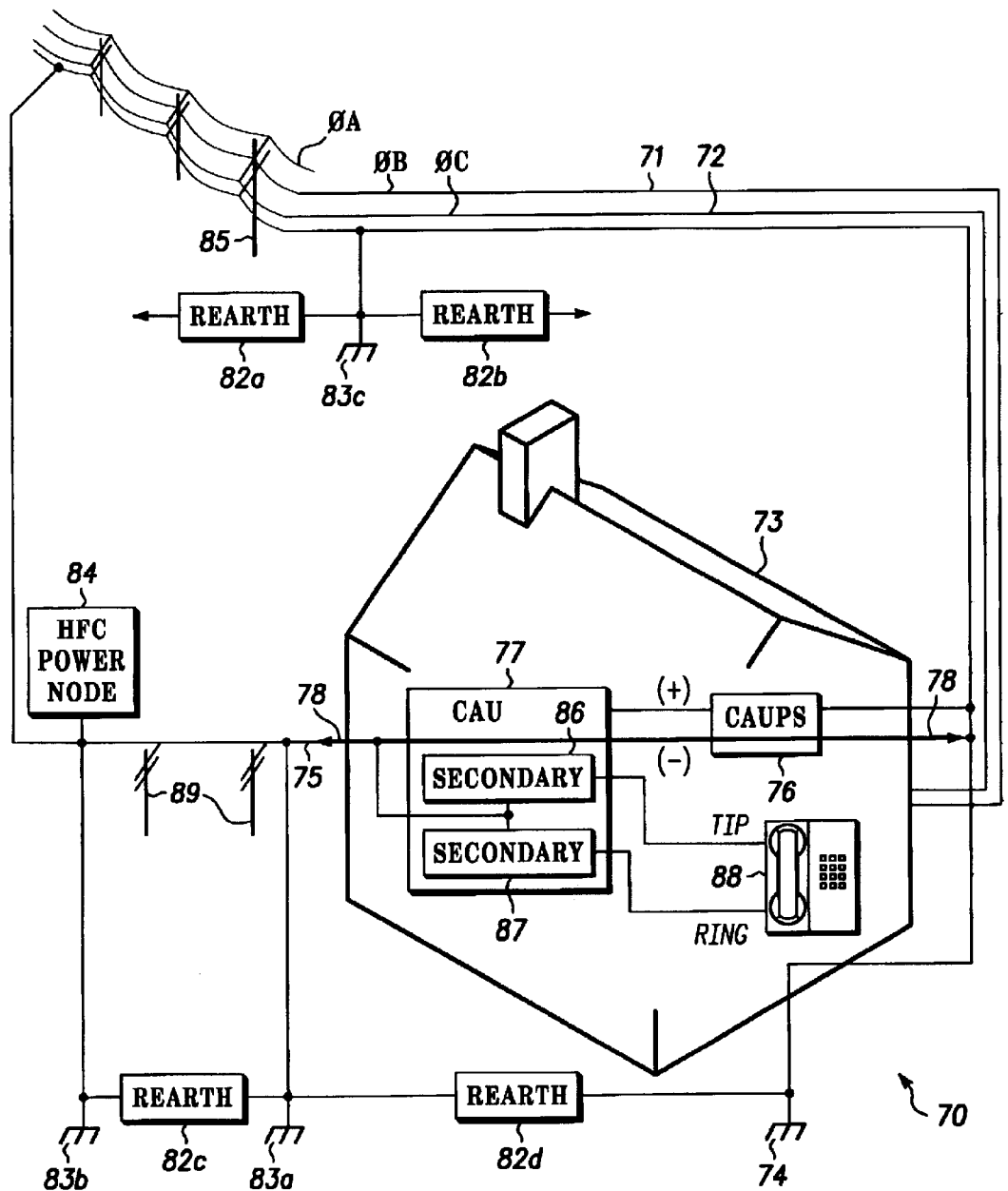
FIG. 7 depicts a current CableComm cable access unit installation.

Turning to FIG. 7, shown therein is a current CableComm Cable Access Unit installation 70. From the power lines poles 85 (or subterranean installation), two phases 71, 72 are provided to the customer premises 73. A ground 74 is also coupled to the customer premises 73. The ground is coupled to the coax braid 75 on the HFC coaxial cable carried over poles 89 (or also in a subterranean installation). One phase 71 is coupled to the Cable Access Unit Power Source 76, which is also provided with a ground connection 74. The Cable Access Unit Power Source provides positive and negative DC power (DC+, DC−) to the Cable Access Unit 77. The CPE telephone is coupled to two secondary circuits 86, 87, which provide communications signals, e.g., tip and ring signals, to a telephone 88, for example, or other customer premises equipment. The secondary connections are coupled in turn to the coax braid. Rearth 82*a–d* couples the various ground connections 83*a–c*, 74. In the HFC plant, an HFC power node 84 provides power. The arrows 78 indicate the surge energy path. The HFC ground to utility isolation is dependent on the CPE and Cable Access Unit Power Source.

Figure 8:
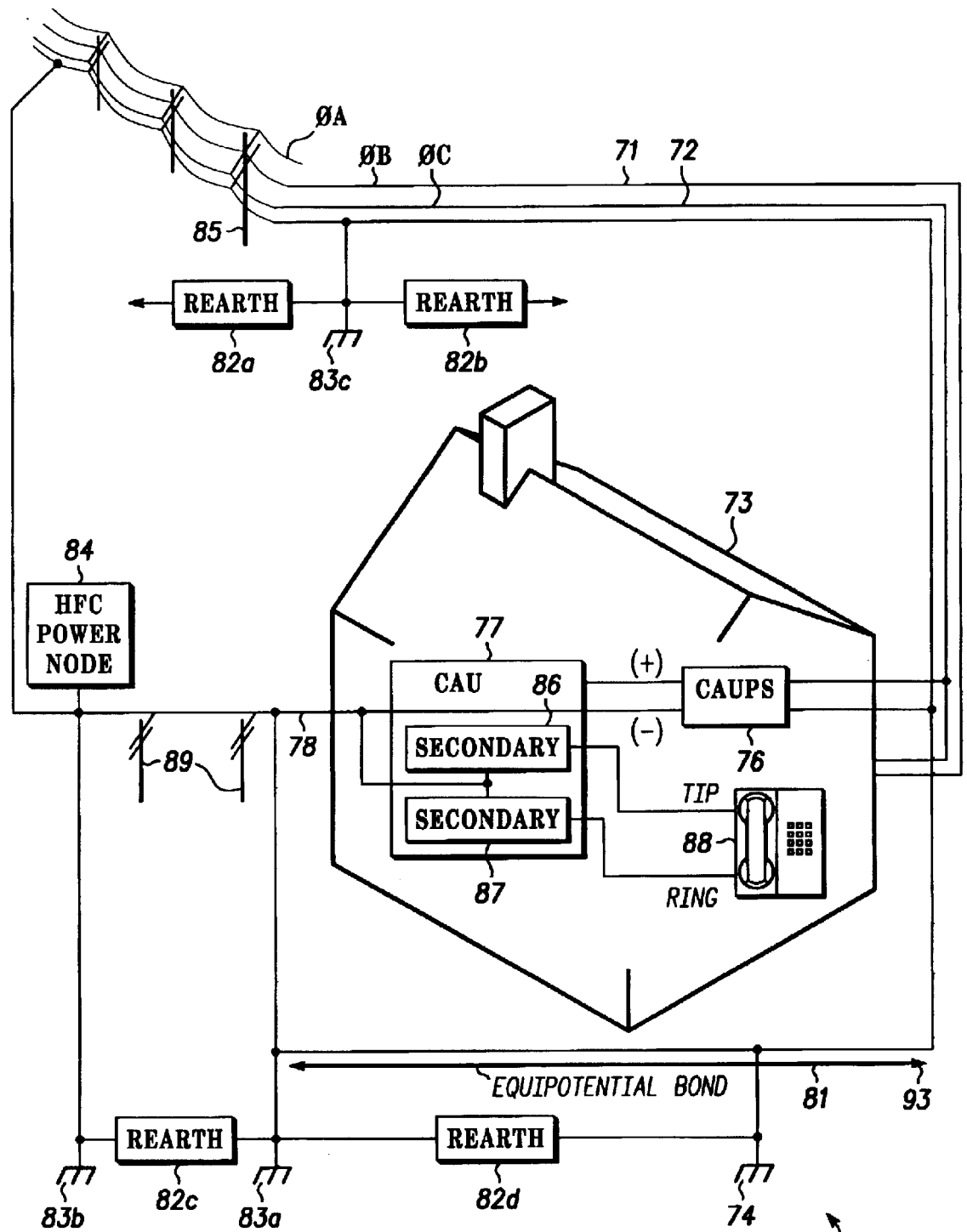
FIG. 8 depicts a typical cable access unit installation with an equipotential bonding per ITU-T K.31 specifications.

Turning to FIG. 8, shown therein is a CableComm Cable Access Unit installation 80 that includes the equipotential bonding requirement 81 of ITU-T-K.31. This equipotential bonding lead 81 removes earth resistance between Cable Access Unit reference and premises. This provides a low impedance path for surge energy between the HFC and the utilities, bypassing the Cable Access Unit, the Power Source, and the CPE. The arrows 93 indicate the surge energy path.

While the systems depicted in FIGS. 7–8 may adequately protect customer premises equipment from power surges, they require connections external to the customer premises equipment, which connections may or may not be implemented without knowledge of the installer of the customer premises equipment. Without knowing whether these types of systems are in fact installed, one cannot be assured that the customer premises equipment will be adequately protected. Moreover, many countries do not traditionally provide these protections, hence a manufacturer cannot guarantee the equipment will be protected in all installation. The embodiments shown herein, however, provide surge protection no matter what other protections are implemented or not at a relatively minimal cost and complexity.

Figure 1:
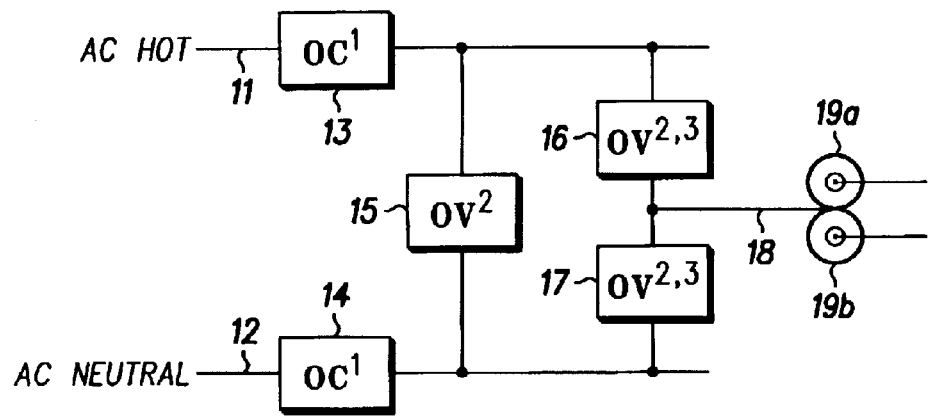
FIG. 1 depicts an exemplary embodiment of an apparatus for protecting customer premises equipment in a two-wire AC mains architecture according to one aspect of the present invention.

According to one aspect of the present invention, an exemplary embodiment shown in FIG. 1 provides a path to allow the surge to pass around the device being protected while still maintaining electrical isolation under normal conditions.

The embodiments herein are not limited to a line plug and socket assembly, as the functionality can be included internally in any premises powered HFCCPE device, such as a television, VCR, set top box, data modem, etc.

Three wire AC mains surge protector systems usually support protection between AC mains hot to neutral, hot to earth and neutral to earth. Newer three wire surge protectors also protect the HFC connections. Depending upon the protector quality, the bonding of the HFC connector is done either metallically to the earthing lead or through an Over-Voltage device, such as an Metal Oxide Varistor (MOV).

Two wire AC mains surge protector systems support protection between AC mains hot to neutral but have no way to address common mode surges between the AC mains hot/neutral and earth. Additionally, these protectors have not addressed the issue with regards to the HFC ground plane differentials with respect to the AC mains hot or neutral conductors.

Turning to FIG. 1, shown therein is a block diagram of an exemplary embodiment 10 for suppressing surge events in a two-wire system. In this embodiment, there are two main wires—an AC "hot" wire 11, and an AC "neutral" wire 12. Two Over-Current (OC) protectors 13, 14 are coupled in series with each of the wires. An Over-Voltage (OV) protector 15 is coupled across the wires 11, 12 on the Customer Premises Equipment (CPE) side of the Over-current protectors 13, 14. Two additional Over-Voltage protectors 16, 17 are coupled in series with each other and are coupled in parallel to the first Over-Voltage protector 15. A lead 18 is coupled between the two series coupled Over-Voltage protectors 16,17, which lead 18 is coupled to one or more Radio Frequency (RF) Coaxial braids 19*a*, 19*b*. The output side of the leads 11, 12 is then coupled to the CPE (not shown). As such, this provides a path around the CPE from the AC lines 11, 12 to the coaxial braid(s) 19*a*, 19*b* or from the coaxial braid(s) 19*a*, 19*b* to the AC mains 11, 12.

Figure 2:
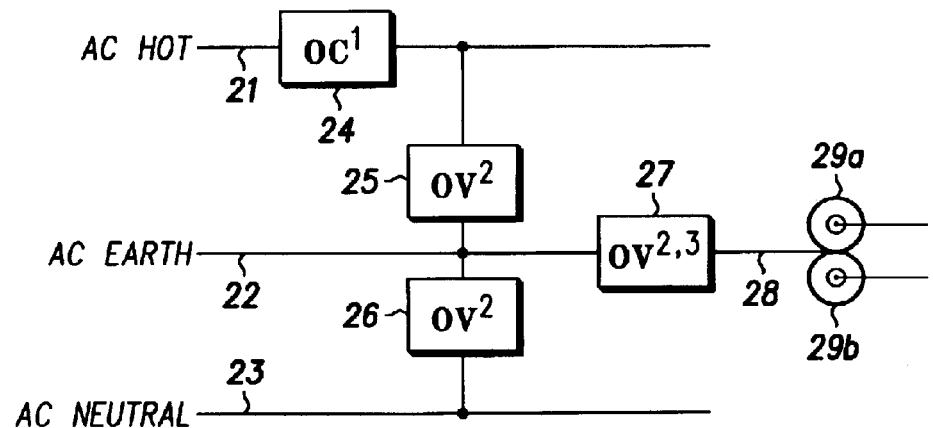
FIG. 2 depicts an exemplary embodiment of an apparatus for protecting customer premises equipment in a three-wire AC mains architecture according to another aspect of the present invention.

Turning to FIG. 2, shown therein is a block diagram of an exemplary embodiment 20 for suppressing surge events in a three-wire system. In this embodiment, there are three main wires—an AC "hot" wire 21, an AC "Earth" wire 22 and an AC "neutral" wire 23. An Over-current protector 24 is coupled in series with the AC hot wire 21. An Over-Voltage (OV) protector 25 is coupled across the AC hot wire 21 and the AC Earth wire 22 on the Customer Premises Equipment side of the Over-Current protector 24. Another Over-Voltage protector 26 is coupled between the AC Earth wire 22 and the AC Neutral wire 23. Yet another Over-Voltage protector 27 is coupled to the AC Earth wire 22. A lead 28 is coupled to the Over-Voltage protector 27, which lead 28 is coupled to one or more RF Coaxial connectors 29*a*, 29*b*.

In the above embodiments 10, 20 the Over-Current protectors may be any one of several technologies, including but not limited to fuses, positive temperature coefficient (PTC) devices, circuit breakers, etc. Absolute current ratings will be dependent upon the specific application, but should be as low as possible without tripping under normal load conditions.

In the above embodiments 10, 20 the Over-Voltage protectors may also be any one of several technologies, including but not limited to has discharge tubes (GDTs), gas tube protector assemblies (GTPs), metal oxide varistors (MOVs), SCR, TRIACs, back-to-back zener diodes, etc. Absolute voltage ratings will be dependent upon the specific application and the AC mains voltage standards, but should be as low as possible without being enabled under normal conditions.

According to one aspect of the present invention, the embodiments herein include an electrical bonding of the HFC coax to the AC mains, as opposed to some prior art devices in which the AC mains hot/neutral and the coax braid are coupled to the 3W earthing pin and not directly between the braid and the AC mains lines. Some prior art devices metallically bond the braid to the earthing pin without any OV or OC protection.

The Over-Voltage device should be selected so as not to trip during a power cross event on the HFC braid. Depending on the specific application, the indicated Over-Voltage device could be replaced with direct metallic bonding to the AC neutral line when polarizing cords are used or to the earth lead of a three lead AC line cord. Over-Voltage protectors that fail in a shorted condition should be protected with a series OC device. Alternately safety "X" or "Y" capacitors could be used for the surge path.

The architecture described above may be integrated within HFC CPE devices, such as televisions, VCRs, set top boxes, data modems, etc. The architecture also leads itself to a standalone device that may be physically implemented in a "wall wart" module to be plugged directly into a wall socket, an in-line as part of a line cord assembly or as a line cord input, outlet protected device.

Figure 3:
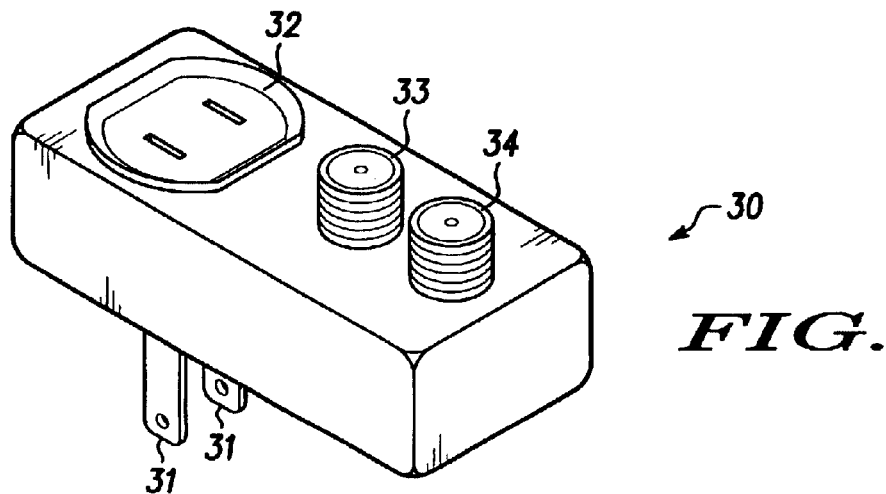
FIG. 3 depicts an exemplary embodiment of an apparatus for protecting customer equipment for inserting into a power outlet according to another aspect of the present invention.

FIG. 3 depicts a conceptual drawing of an exemplary embodiment 30 of a device according to another aspect of the present invention. This embodiment 30 is an AC Mains plug and receptacle implementation. This embodiment 30 may be two-wire or three-wire depending on local standards or conventions. Line cords may either be polarized or non-polarized. This embodiment 30 plugs directly into a wall socket via plug 31. An input plug receptacle 32 is provided for convenience. Two RF connectors 33, 34 are provided. Specific connector placement or orientation is not critical in the practice of the embodiments of the present invention. While two RF connectors are shown, only one is required for protection. The second connector is provided for convenience (e.g., an input/output implementation). This embodiment includes an electrical bonding of the HFC coax (or other ground connection) to the AC mains.

Figure 4:
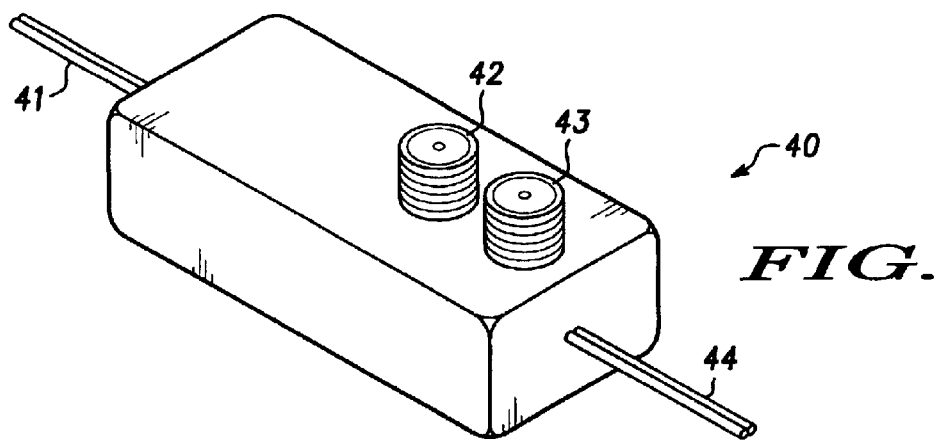
FIG. 4 depicts an exemplary embodiment of an apparatus for protecting customer equipment, which provides power to the device under protection according to another aspect of the present invention.

FIG. 4 depicts a conceptual drawing of an exemplary embodiment 40 of a device according to yet another aspect of the present invention. This embodiment 40 provides a two or three wire AC line cord to the device to be protected. This embodiment 40 may be two-wire or three-wire depending on local standards or conventions. Line cords may either be polarized or non-polarized. This embodiment 40 has an AC line input 41, two RF connectors 42, 43 and an AC line output 44.

Figure 5:
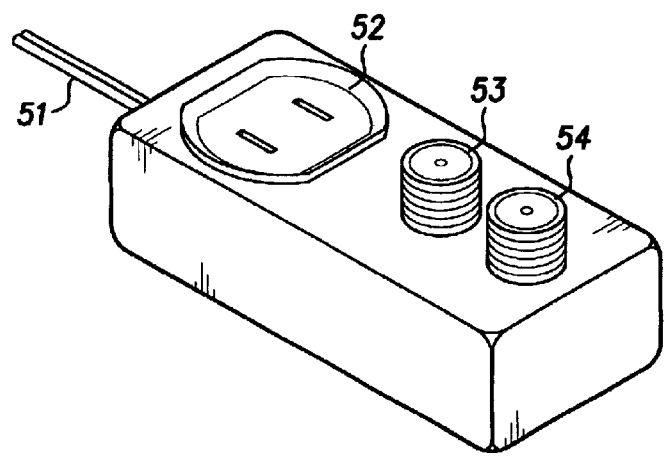
FIG. 5 depicts an exemplary embodiment of an apparatus for protecting customer equipment that provides an outlet into which a plug may be inserted from the equipment to be protected according to yet another aspect of the present invention.

FIG. 5 depicts a conceptual drawing of an exemplary embodiment 50 of a device according to still another aspect of the present invention. This embodiment 50 includes a two or three wire AC socket output to the device to be protected. This embodiment 50 may be two-wire or three-wire depending on local standards or conventions. Line cords may either be polarized or non-polarized. This embodiment 50 has an AC line input 51, an AC socket receptacle 52, and two RF connectors 53, 54.

Figure 9:
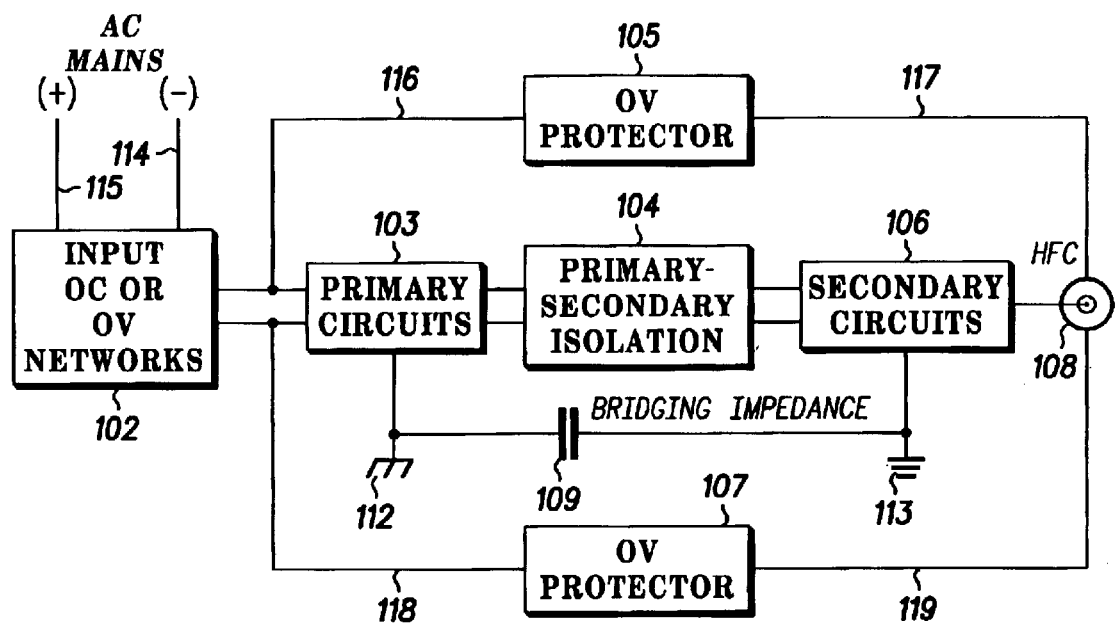
FIG. 9 depicts a block diagram of an exemplary embodiment of a device having an internal coupling between the AC mains and the coaxial braid according to still another aspect of the present invention.

Turning to FIG. 9, shown therein is an exemplary embodiment 100 of a typical Power Supply in a schematic diagram. The Secondary Circuits ground plane 113 is isolated from the AC mains neutral and the Primary Circuits ground plan 112. This places the surge stress across the Primary Circuits and its associated circuits. This led to component failures in this area. In this embodiment, two MOVs 105, 107 are coupled to each AC line 116, 118, as the AC line cord may not be polarized, hence any solution must assume that either line 116, 118 may be neutral or hot. Therefore, an over-voltage protector is necessary from each AC line to the Secondary Circuits grounds 113,108. Two EMI coupling capacitors 109 couple fast energy surges to the Primary Circuits ground plane. The MOV voltage selection should be so that if a power cross occurs on the HFC ground, the MOV does not trip. If safety requirements do not allow an MOV, then "X" or "Y" safety capacitors can be used similar to EMI coupling capacitors 109. Over-current protection (e.g., additional fusing) may be required if the MOV fails in a shorted condition.

Although various embodiments are specifically illustrated and described herein, it will be appreciated that modifications and variations of the invention are covered by the above teachings and are within the purview of the appended claims without departing from the spirit and intended scope of the invention. Furthermore, these examples should not be interpreted to limit the modifications and variations of the invention covered by the claims but are merely illustrative of possible variations.

What is claimed is:

1. An apparatus for protecting equipment with a primary circuit, including a first ground, and a secondary circuit, including a second ground, from energy surges, which equipment is coupled to a communications cable that has at least one ground connection and to an AC power source, said apparatus comprising:

an input protection network coupled to the AC power source and having an output including an AC positive line and an AC negative line;

a primary-secondary isolation circuit coupled between the primary circuit and the secondary circuit;

a first over-voltage protector coupled between the AC positive line and the at least one ground connection of the communications cable; and a second over-voltage protector coupled between the AC negative line and the at least one ground connection of the communications cable.

2. The apparatus according to claim 1, further comprising a primary-secondary bridging impedance coupled in parallel between the primary and secondary circuits and the first and second grounds.

3. The apparatus according to claim 1, wherein the at least one ground connection of the communications cable includes a coaxial braid of the communications cable.

4. An AC mains-powered communications apparatus with protection from energy surges for coupling to a communications network having at least one ground connection, said apparatus comprising:

an input protection network being couplable to the AC mains, said input protection network having a protected power output including at least one AC positive line and one AC negative line;

a primary circuit including a first grounding connection and being coupled to the protected power output of the input protection network and having a power output for providing power;

a secondary circuit being couplable to a communications network, said secondary circuit including a second grounding connection and receiving power via the power output of the primary circuit;

a first over-voltage protector coupled between the AC positive line or the protected power output of the input protection network and the at least one ground connection of the communications network; and a second over-voltage protector coupled between the AC negative line and the at least one ground connection of the communications network.

5. The apparatus according to claim 4, further comprising a primary-secondary isolation circuit coupled between the primary circuit and the secondary circuit and providing isolated power to the secondary circuit.

6. The apparatus according to claim 4, further comprising a primary-secondary bridging impedance having one end coupled between the primary power circuit and the first grounding connection and a another end coupled between the secondary circuit the second grounding connection.

7. The apparatus according to claim 4, wherein the at least one ground connection of the communications network includes coaxial braid of the communications cable.

* * * * *